United States Patent
Seiler et al.

(10) Patent No.: US 8,898,498 B2
(45) Date of Patent: Nov. 25, 2014

(54) METHOD FOR OPTIMIZING PARAMETER SETTINGS OF ENERGY SUPPLY PARAMETERS OF A FIELD DEVICE POWER SUPPLY MODULE

(75) Inventors: Christian Seiler, Auggen (DE); Marc Fiedler, Reinach (CH); Stefan Probst, Weil am Rhein (DE)

(73) Assignee: Endress + Hauser Process Solutions AG, Reinach (CH)

( * ) Notice: Subject to any disclaimer, the term of this patent is extended or adjusted under 35 U.S.C. 154(b) by 348 days.

(21) Appl. No.: 13/513,330

(22) PCT Filed: Nov. 8, 2010

(86) PCT No.: PCT/EP2010/066976
§ 371 (c)(1),
(2), (4) Date: Sep. 18, 2012

(87) PCT Pub. No.: WO2011/067071
PCT Pub. Date: Jun. 9, 2011

(65) Prior Publication Data
US 2013/0002229 A1    Jan. 3, 2013

(30) Foreign Application Priority Data
Dec. 4, 2009   (DE) .......................... 10 2009 047 538

(51) Int. Cl.
*G05F 1/32*     (2006.01)
*G05B 13/02*    (2006.01)
*G05B 19/042*   (2006.01)

(52) U.S. Cl.
CPC .......... *G05B 19/0426* (2013.01); *G05B 13/025* (2013.01); *G05B 2219/25064* (2013.01); *G05B 2219/25428* (2013.01)

USPC .......................................................... 713/323

(58) Field of Classification Search
USPC .................. 323/318; 713/300, 320, 322, 323; 340/539.3
See application file for complete search history.

(56) References Cited

U.S. PATENT DOCUMENTS 7,302,592 B2 * 11/2007 Shipton et al. ................ 713/300
7,313,465 B1 * 12/2007 O'Donnell .................... 700/291

(Continued)

FOREIGN PATENT DOCUMENTS

DE          10255741  A1   6/2004
DE       102005039438 A1   2/2007

(Continued)

OTHER PUBLICATIONS

German Search Report, Nov. 8, 2010.

(Continued)

*Primary Examiner* — Adolf Berhane
(74) *Attorney, Agent, or Firm* — Bacon & Thomas, PLLC

(57) ABSTRACT

A method for optimizing the parameter setting of at least one energy supply parameter of a field device power supply module. The field device power supply module is, in such case, connected exclusively to one field device. The connected field device is supplied with electrical energy by the field device power supply module. In the method, the system composed of field device and field device power supply module is operated and a parameter setting of at least one energy supply parameter varied. In such case, the operation of the field device is monitored. Parameter settings are ascertained, in the case of which a relatively low energy consumption of the field device and simultaneously a safe operation of the field device can be realized in the relevant operational phase.

15 Claims, 6 Drawing Sheets

(56) References Cited

U.S. PATENT DOCUMENTS

| | | | |
|---|---|---|---|
| 8,281,174 B2 * | 10/2012 | Seiler | 713/323 |
| 8,316,254 B2 * | 11/2012 | Kaneko et al. | 713/323 |
| 8,344,880 B2 * | 1/2013 | Seiler et al. | 340/539.3 |
| 8,433,530 B2 * | 4/2013 | Shimada et al. | 702/62 |
| 2005/0188230 A1 | 8/2005 | Bilak | |
| 2005/0283630 A1 | 12/2005 | Shikata | |
| 2006/0125625 A1 | 6/2006 | Wittmer | |
| 2009/0219084 A1 | 9/2009 | Michalski | |
| 2010/0201342 A1 | 8/2010 | Thoren | |
| 2010/0222895 A1 | 9/2010 | Seiler | |

FOREIGN PATENT DOCUMENTS

| | | |
|---|---|---|
| DE | 102006009979 A1 | 9/2007 |
| DE | 102006011501 A1 | 9/2007 |
| DE | 102006017243 A1 | 10/2007 |
| DE | 102007048476 A1 | 4/2009 |
| DE | 102007053057 A1 | 5/2009 |
| DE | 102007054923 A1 | 5/2009 |
| EP | 2224139 A2 | 9/2010 |
| WO | WO 99/44110 | 9/1999 |
| WO | W O 00/67102 | 11/2000 |
| WO | WO 2005/103851 A1 | 11/2005 |
| WO | WO2009/060000 A1 | 5/2009 |

OTHER PUBLICATIONS

International Search Report, Nov. 6, 2012.

* cited by examiner

METHOD FOR OPTIMIZING PARAMETER SETTINGS OF ENERGY SUPPLY PARAMETERS OF A FIELD DEVICE POWER SUPPLY MODULE

TECHNICAL FIELD

The present invention relates to a method for optimizing the parameter setting of at least one energy supply parameter of a field device power supply module.

BACKGROUND DISCUSSION

In process automation technology, field devices are often applied for registering and/or influencing process variables. Serving for registering process variables are sensors, such as, for example, fill level measuring devices, flow measuring devices, pressure- and temperature measuring devices, pH-redox potential measuring devices, conductivity measuring devices, etc., which register the corresponding process variables, fill level, flow, pressure, temperature, pH-value, and conductivity, respectively. Serving for influencing process variables are actuators, such as, for example, valves or pumps, via which the flow of a liquid in a section of pipeline, or the fill level in a container, can be changed. Especially such sensors and actuators are referred to as field devices. A large number of such field devices are available from the firm, Endress+Hauser.

In modern industrial plants, field devices are, as a rule, connected with superordinated units via bus systems (Profibus®, Foundation® Fieldbus, HART®, etc.). Normally, the superordinated units are control systems, or control units, such as, for example, PLCs (programmable logic controllers). The superordinated units serve, among others, for process control, process visualizing, process monitoring as well as for start-up of the field devices. The measured values registered by the field devices, especially sensors, are transmitted via the particular bus system to one (or, in given cases, a number of) superordinated unit(s). Along with that, also required is data transmission from the superordinated unit via the bus system to the field devices, especially for configuring and parametering the field devices as well as for operating actuators.

Besides wired data transmission in a fieldbus system, there is also the opportunity for wireless data transmission. For implementing wireless data transmission, newer field devices are, in part, embodied as radio field devices. These have, as a rule, a radio unit as an integral component. Furthermore, they can also have an integrated electrical current source, such as, for example, a single-use battery, so that they are operable autarkically.

Along with that, there is also the opportunity to turn field devices without a radio unit (i.e. with only a wired communication interface), and without their own electrical current source, into a radio field device, by connecting a wireless adapter, which has a radio unit. For example, the publication WO 2005/103851 A1 describes a wireless adapter. In such case, a wireless adapter is preferably embodied in such a manner that it also enables energy supply of the connected field device. In the latter case, the wireless adapter simultaneously forms a field device power supply module.

Similarly as in a field device, also in a wireless adapter, a number of parameters are provided. In part, these are preset by the manufacturer of the wireless adapter and/or can be set by a user, especially changed, activated and/or deactivated. The parameters are, as a rule, stored in a memory of the wireless adapter. In this way, a corresponding control unit (e.g. a microprocessor) of the wireless adapter can access these parameters and operate the wireless adapter corresponding to the parameter settings of the parameters. The respective parameter settings of the parameters determine, in such case, the manner of operation of the wireless adapter.

In case the wireless adapter can also provide an energy supply of the connected field device, i.e. the wireless adapter is embodied as a field device power supply module, then provided in the wireless adapter are corresponding parameters. These parameters enable settings relative to the energy supply (or electrical current supply) of the field device. These parameters are referred to in the following as energy supply parameters. As a function of the field device type connected to the wireless adapter, there are different requirements relative to the energy supply by the wireless adapter. Depending on field device type, thus, corresponding parameter settings of the energy supply parameters must be performed, in order to be able to assure an optimal energy supply by the wireless adapter for the connected field device.

In such case, there has been to this point in time the opportunity to use for the energy supply parameters of the wireless adapter so called default-parameter settings (standard parameter settings, which can also already be preset), which are applicable for a large number of field device types. However, such default parameter settings do not, as a rule, enable an optimal energy supply of the connected field device type. The consequence thereof can be, especially, an increased energy consumption and/or a longer time period, until a valid measured value is delivered by the field device. Furthermore, there is the opportunity that the adjusting of the energy supply parameters be performed by a user. Also, here, the problem arises that the user must, first of all, ascertain the parameter settings of the energy supply parameters optimal for the particular connected field device type (for example, by looking in the manual of the particular field device, etc.) and must then input these into the wireless adapter. The user must expend a relatively high effort for this. Also, the danger that errors occur is relatively large.

SUMMARY OF THE INVENTION

Accordingly, an object of the present invention is to provide a method, which enables in the case of a field device power supply module, especially in the case of a wireless adapter, the selecting of energy supply parameter settings suitable for a connected field device type.

The object is achieved by a method for optimizing parameter settings of at least one energy supply parameter of a field device power supply module. The field device power supply module is, in such case, connected to exclusively one field device (especially a sensor or an actuator). Furthermore, the field device power supply module includes an electrical energy source or is connected to such and the connected field device is supplied by the field device power supply module with electrical energy (or electrical power). The at least one energy supply parameter concerns, in such case, energy supply of the field device by the field device power supply module. The method of the invention comprises steps as follows:

A) operating the system comprising the field device and the field device power supply module in an operational phase of the field device;

B) automated varying, according to predetermined rules, of a parameter setting of at least one energy supply parameter of the field device power supply module relevant for the operational phase and automated monitoring of the operation of the field device; and C) automated ascertaining of a parameter setting of the at least one varied energy supply parameter, in the case of which a relatively low energy consumption of the field device and simultaneously a safe operation of the field device in the relevant operational phase can be realized.

The optimizing method of the invention enables ascertaining for a connected field device type parameter settings, which provide safe operation of the field device in the relevant operational phase. This is especially achieved by the feature that the respective parameter settings are tested by setting them in the field device power supply module and then monitoring the operation of the field device. Furthermore, parameter settings are ascertained, by which relatively low energy consumption can be realized. In this way, especially both the effort as well as the risk of input errors by a user can be reduced.

The steps of "automated varying" and "automated ascertaining" are performed, in such case, especially in such a manner (according to predetermined rules) that parameter settings are ascertained, which enable simultaneously an as low as possible energy consumption and a safe operation of the field device. The parameter settings are preferably ascertained in such a manner that the energy supply is set, not on the lowest limit of the electrical energy required, in each case, by the field device, but, instead, somewhat above such limit.

Referred to generically or singly as an "operational phase" herein are especially those operating states of the field device, in the case of which, in each case, equal requirements relative exist to the need for energy. For example, form a starting phase and normal operation are two operational phases, wherein in the starting phase other requirements for the energy supply are present than in the normal operation.

Depending on operational phase, it can, in such case, be provided that the field device is operated continuously in one operational phase (for example, in normal operation) and, in such case, (at least) one parameter setting is varied as well as the manner of operation monitored (the steps in paragraph B)). Alternatively, however, also an operational phase (e.g. a starting phase) can be completely run through with a certain parameter setting (of at least one energy supply parameter) and, in such case, the operation monitored (the steps in paragraph B)). The parameter setting is only then changed (e.g. as a function of the result of the preceding running) and the loop is then run through anew.

The field device power supply module need not absolutely be embodied as a wireless adapter. Rather, it can be, in general, a module, which is embodied for connection to a (single) field device and through which the one connected field device is suppliable with electrical energy (or electrical power). For example, instead of the previously frequently provided, direct connection of a field device to the grid current, it can also be provided that it is connected via a field device power supply module of the invention to the grid current or also to another energy source, which can be embodied externally of, and/or internally in, the field device power supply module, so that the field device is supplied with electrical energy by the field device power supply module. In this way, the electrical current supply can be optimally matched to the respective field device type. Correspondingly, consumption of electrical energy can be reduced. Besides the electrical current supply of the connected field device, the field device power supply module can also perform yet other functions.

In a field device power supply module, in such case, in corresponding manner, as this is explained above in reference to a wireless adapter, parameters are provided, through which a manner of operation of the field device power supply module is adjustable. The parameters are, in such case, especially stored in a memory of the field device power supply module, so that a control unit (e.g. a microprocessor) of the field device power supply module can access these parameters and operate the field device power supply module corresponding to the parameter settings. Especially, energy supply parameters are provided in the field device power supply module, wherein through the parameter setting of these energy supply parameters, the properties, or characterizing variables, of the energy supply (or electrical current supply) provided by the field device power supply module are adjustable. The field device power supply module is, in such case, connected to exclusively one field device. Especially, it is not embodied for energy supply of a plurality of field devices connected in parallel. Accordingly, the energy supply parameters can also be set specially for the particularly connected field device type, so that its energy supply is optimized. Preferably, the field device power supply module is connected releasably to a field device. In this way, it is connectable, in simple manner, to different field devices, especially also to different field device types.

The energy supply parameters concern energy supply of the connected field device by the field device power supply module. Especially, these parameters permit the electrical energy (especially electrical power) provided by the field device power supply module to be matched to a power requirement of the particular connected field device type and, in given cases, also to different operating phases of this field device type. Examples of energy supply parameters include, among others, electrical current values, voltage values and/or time periods (during which, for example, a certain voltage value is to be provided), etc.

To the extent that some steps of the method are said to be "automated", this means that these are executed without human intervention, especially by soft- and/or hardware. In the method of the invention, especially the steps of varying, monitoring and ascertaining involve automated performance.

In a further development, the field device power supply module is in the form of a wireless adapter, by which a wireless signal transmission is effected for the connected field device. In this way, a conventional field device can be retrofitted into a radio field device and simultaneously be operated in an energy saving manner. In such case, it can be provided that all communication for the field device is performed wirelessly by the wireless adapter. This is, however, not absolutely necessary. Rather, it can also be provided that a part of the communication occurs by wire. For example, it can be provided in the case of a HART® field device that a measured value is transmitted analogly via a wired communication connection according to the 4-20 mA-standard, while other information is transmitted wirelessly through the wireless adapter.

The wireless adapter can especially be embodied in such a manner that it forms a communication participant of a radio, or wireless, network according to the standard IEEE 802.15.4. The radio network can, furthermore, be embodied according to the wireless HART®-standard or according to the ISA100 standard, which, in each case, builds upon the standard IEEE 802.15.4. In the case of the said radio, or wireless, networks, the wireless adapter communicates, as a rule, with a gateway, which enables communication with a network superordinated to the radio network, a superordinated network such as, for example, a wired fieldbus, a company network (e.g. an Ethernet®-network), the Internet and/or a system communicating via GSM, etc. Connected to the superordinated network can be, for example, a superordinated unit, which provides process control, plant asset management system, a visualizing system, etc., so that communication is enabled between these and the field device (via the gateway and the wireless adapter). Alternatively to the above said standardized radio, or wireless, networks, however, also other radio, or wireless, networks can be applied. Additionally or alternatively, the wireless adapter can also be embodied in such a manner that it enables direct wireless communication (for example, via GSM, Bluetooth, wireless LAN, etc.). In this way, it can communicate wirelessly directly with a communication unit (e.g. a superordinated unit, which provides process control, plant asset management system, a visualizing system, a vendor asset management system, etc.), which requests, for example, a transmitted measured value or sends control commands to the wireless adapter, etc.

In a further development, the field device power supply module includes at least one autarkic, electrical current source. In this way, the system composed of field device and field device power supply module is operable decoupled from a grid current. If the field device power supply module is simultaneously embodied as a wireless adapter, then the system of field device and wireless adapter can be operated completely autarkically (i.e. without connection to an external electrical current grid and without wired connection to a fieldbus or to a network). This is especially advantageous in the case of exposed and/or difficultly accessible locations and/or locations exposed to extreme conditions of use in a plant. The field device power supply module can especially have a single-use battery, a rechargeable battery and/or a solar cell as the autarkic, electrical current source.

In a further development, the field device power supply module is connected to a communication interface of the field device.

If the field device power supply module is embodied as a wireless adapter, then, for sending data via the fieldbus, these data are sent via the communication interface (wired) to the wireless adapter, which then transmits these via radio to the target location. Conversely, the wireless adapter can receive data via radio and forward such (by wire) via the communication interface to the field device. In a further development, the communication interface is embodied as a fieldbus communication interface and communication therethrough occurs according to the respective fieldbus protocol. In such case, especially a standardized fieldbus system is suitable, such as, for example, Profibus® (compare Profibus Profile Specification, version 3.0) or Foundation® Fieldbus (compare Foundation® specification, Function Block Application Process, revision EN 1.7), wherein a fieldbus communication interface according to the HART®-standard (compare HART® Field Communication Protocol Specifications, revision 7.0) is preferable due to the frequent application of this fieldbus system and due to its good suitability for wireless communication. If the field device power supply module is embodied simultaneously as a wireless adapter, then preferably the wireless communication also occurs according to the respective fieldbus standard, according to which also the (wired) communication interface of the field device is embodied. In reference to the wired communication interface of the field device, the field device can be embodied as a 2 conductor device, which means that both the communication as well as also the energy supply (or electrical current supply) of the field device occurs via a shared 2 conductor connection. Furthermore, the field device can also be embodied as a 4 conductor device, which means that the communication occurs via one 2 conductor connection and the energy supply of the field device via another 2 conductor connection.

In a further development, the steps of automated varying, automated monitoring and automated ascertaining are executed by the field device power supply module. In this way, the method of the invention can be executed completely in the field device power supply module. As a result, there is no dependence on external systems and no communication with external systems is required.

In a further development, in the step of automated varying, in an operational phase of the field device, a parameter setting of an energy supply parameter in terms of a voltage, which is to be provided to the field device in the relevant operational phase of the field device power supply module, is varied and the operation of the field device is monitored (the steps in paragraph B)). Through the varying of this parameter setting, accordingly, also the voltage provided by the field device power supply module to the field device is varied. In this way, in simple manner, the voltage required for the particular operational phase can be ascertained.

In such case, the predetermined rules, according to which the step of automated varying is performed, are embodied especially in such a manner that when, in an operational phase of the field device in the step of automated monitoring, no malfunction of the field device is detectable (which is caused by an insufficient energy supply), in this operational phase, a parameter setting of the energy supply parameter of the voltage is reduced to a lower voltage value and the operation of the field device is monitored (anew). Furthermore, the predetermined rules, according to which the step of automated varying is performed, are embodied especially in such a manner that when, in an operational phase of the field device in the step of automated monitoring, a malfunction of the field device is detectable (which is caused by an insufficient energy supply), in this operational phase, a parameter setting of the energy supply parameter of the voltage is increased to a higher voltage value and the operation of the field device is monitored (anew).

In a further development, in the step of automated monitoring, the operation of the field device is monitored for the occurrence of one or more of the following malfunctions:

a) occurrence of a device crash of the field device;

b) occurrence of an electrical current decline of the electrical current value flowing through the field device below a predetermined limit value; and/or c) occurrence of a disturbance of a communication between the field device and the field device power supply module.

In the case of occurrence of such malfunctions, it can especially be established that safe operation of the field device is no longer possible at the respective parameter settings. In such case, the monitoring for one or more of the said malfunctions can, in given cases, also occur as a function of the respective operational phase. The occurrence of an electrical current decline is especially an indication of a malfunction, when a HART®-field device is involved, which is operated in the operational phase of normal operation in a multidrop mode. In such a multidrop mode, the electrical current value is set not in a 4-20 mA mode but, instead, at a fixed electrical current value, which is as low as possible (e.g. 4 mA), and communication via the HART®-communication interface is exclusively digital. Also, it can be recognized from an electrical current decline that a device crash occurred and the field device was restarted. The occurrence of a disturbance of a communication in operating phases, in which a communication between the field device and the field device power supply module should be possible, such as, for example, in the normal operating phase, is an indication of a malfunction. In addition to these, the monitoring can also look for other possible malfunctions, such as, for example, whether a status report transmitted, as a rule, with a measured value is positive (status "GOOD") or negative (status "BAD").

In a further development, the field device power supply module has one or more of the following energy supply parameters:

a) a starting voltage, which is provided by the field device power supply module after turn-on of the field device for a starting time;

b) a starting current, which gives the maximum electrical current requirement of the field device during the starting time;

c) a starting time, during which the starting voltage is provided by the field device power supply module for the field device;

d) an operating voltage, which is provided by the field device power supply module after expiration of the starting time for normal operation of the connected field device; and/or e) a setup time period, which is the time period from the end of the starting time up to the point in time, at which the field device delivers a valid measured value.

The setting of the energy supply parameters, including starting voltage, starting time and starting current, should, in such case, occur (as a function of the respectively connected field device type) in such a manner that sufficient energy supply of the field device is assured during its starting phase. After the starting phase, the field device switches to normal operation, in which it likewise requires a sufficiently high voltage, which can deviate from the voltage required during the starting phase. The voltage provided by the field device power supply module for the normal operation (that is, after expiration of the starting time) is determined by the setting of the energy supply parameter "operating voltage". The field device can, in such case, run through the starting phase and the switching to normal operation upon switch-on from an "off" state and/or from a sleep-mode. Especially, these phases can be run through upon each switch-on, when operation is in a clocked mode. Depending on field device type, in such case, however, also other and/or further operating phases of the field device can be provided with corresponding voltage- and electrical current requirements. In corresponding manner, also provided in the field device power supply module can be other or further energy supply parameters, by which, in each case, an appropriate energy supply of the connected field device can be set for the various operating phases.

In a further development, for ascertaining a parameter setting of an energy supply parameter in terms of a time period of an operational phase of the field device or a time period of a section of an operational phase of the field device, a sufficient energy supply of the field device is provided by the field device power supply module and the time period measured, which the field device requires for passing through the operational phase, or the section of the operational phase. The providing of a sufficient energy supply can be achieved, for example, by using for the relevant energy supply parameters default parameter settings or parameter settings ascertained earlier (for example, by the method of the invention).

An energy supply parameter in terms of a time period of an operational phase is, for example, the above mentioned "starting time". For ascertaining the parameter setting for this energy supply parameter, especially a sufficient energy supply of the field device is provided by the field device power supply module and the time period from turn-on of the field device up to a switching of the field device into normal operation is measured. The switching of the field device into normal operation is especially detected when the electrical current required by the field device is at a fixed electrical current value and/or when communication (for example, HART®-communication) between the field device and the field device power supply module is enabled. The moving to a fixed electrical current value is especially a sign for a switching into normal operation, when the field device is operated in normal operation in a multidrop mode.

An energy supply parameter in terms of a time period of a section of an operational phase is, for example, the above mentioned "setup time period". For ascertaining the parameter setting of this energy supply parameter, especially a sufficient energy supply of the field device is provided by the field device power supply module and the time period measured from switching of the field device into normal operation up to the point in time, at which the field device delivers a valid measured value.

In a further development, for the case, in which the field device requires a higher voltage in a following operational phase, as parameter setting of the energy supply parameter (the time period of an operational phase of the field device or the time period of a section of an operational phase of the field device), a predetermined offset is subtracted from the measured time period. Additionally or alternatively, for the case, in which the field device in a following operational phase requires a lower voltage, as parameter setting of the energy supply parameter, a predetermined offset (i.e. a predetermined time period) is added to the measured time period. Through these offsets, a sufficient energy supply assured is also when the field device is switching from one operational phase into another operational phase, even when the switching does not occur exactly at the expected point in time.

In a further development, for ascertaining a parameter setting of an energy supply parameter in terms of the starting voltage, steps are performed as follows:

D) placing the system composed of field device and the field device power supply module in operation with a predetermined parameter setting of an energy supply parameter in terms of the starting voltage and monitoring the operation of the field device as to whether it switches into normal operation; and E) increasing the parameter setting in terms of the starting voltage to a higher voltage value, when the field device does not switch into normal operation; or F) lowering the parameter setting in terms of the starting voltage to a lower voltage value, when the field device switches into normal operation; and G) renewed placing of the system composed of field device and the field device power supply module in operation with the changed parameter setting of the starting voltage and monitoring the operation of the field device as to whether it switches into normal operation.

In such case, the monitoring is preferably performed during the running of the total starting phase (to the extent that the running continues). The switching of the field device into normal operation means that energy supply during the starting phase was sufficient. The steps of lowering (step F)) and renewed placing (step G)) permit testing whether a yet lower setting of the starting voltage is possible, in order to achieve a lesser consumption of energy.

In a further development, for ascertaining a parameter setting of an energy supply parameter in terms of the operating voltage, in the step of automated varying in the operational phase of normal operation of the field device, the set operating voltage is varied and the operation of the field device is monitored.

In a further development, for ascertaining a parameter setting of an energy supply parameter in terms of the starting electrical current, the system composed of field device and field device power supply module is placed in operation, wherein a sufficient voltage for the starting phase is provided by the field device power supply module and the maximum electrical current value used by the field device during the starting time is measured by the field device power supply module. The electrical current used by the field device during the starting phase can, in such case, also vary during the starting phase. The providing of a sufficiently high voltage for the starting phase can be achieved, for example, by a default parameter setting of the starting voltage. Preferably used as parameter setting for the starting voltage is a voltage value ascertained earlier for the respective field device type (for example, according to the method of the invention).

In a further development, the ascertained parameter setting of the at least one energy supply parameter is adopted in the field device power supply module. As a result, the field device power supply module is operated with this ascertained parameter setting.

Furthermore, according to a further development, it is provided that the method of the invention is started by a user. This can occur, for example, via a service unit provided on the field device power supply module or also from an external communication unit, which is in communicative connection by wire and/or via radio with the field device power supply module. Furthermore, the method of the invention can be started automatically or initiated by a user also from a configuration unit, in which a corresponding configuration tool (e.g. the FieldCare® tool of Endress+Hauser) is implemented. Furthermore, it can be provided that the field device power supply module monitors whether a new field device type is connected, and, when it senses such a change, it then performs the method of the invention. Furthermore, the field device power supply module can be so embodied that (for example, via a configuration tool) it is configurable when and under which circumstances the method of the invention is executed.

The present invention relates, furthermore, to a field device power supply module, which has an electrical energy source, or is connectable to such, and which is embodied in such a manner that it is connectable to exclusively one field device, that it can supply a connected field device with electrical energy, that it has energy supply parameters, which concern energy supply of a connected field device by the field device power supply module, and that it can perform the method of the invention, in given cases, also according to one or more of the explained further developments and/or variants. Such a field device power supply module especially achieves the above explained advantages. Especially, the field device power supply module is embodied in such a manner, that it can perform the steps of automated varying and automated monitoring (steps in B)) and automated ascertaining (step C)).

BRIEF DESCRIPTION IN CONJUNCTION OF THE DRAWINGS

Other advantages and utilities of the invention will become evident based on the following description of examples of embodiments with reference to the appended drawing, the figures of which show as follows.

DETAILED DISCUSSION IN CONJUNCTION WITH THE DRAWINGS

Figure 1:
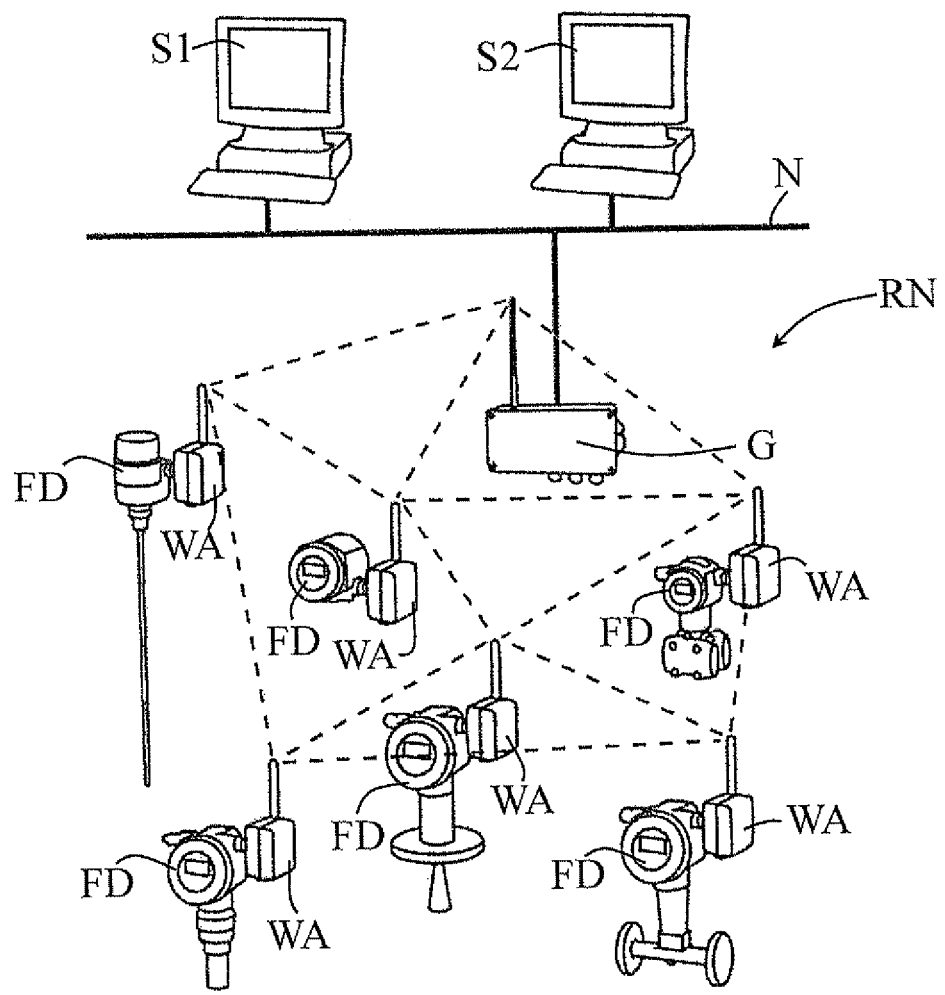
FIG. 1 is a schematic representation of a part of an automated process plant with a radio network.

FIG. 1 shows schematically a part of an automated process plant with a radio network RN. The radio network RN includes a plurality of field devices FD with, in each case, a thereto connected wireless adapter WA, as well as a gateway G. The wireless adapters WA are connected by radio with one another and with the gateway G, this being indicated in FIG. 1 by the dashed lines. The radio network is embodied according to the wireless HART® standard. In the case of the illustrated example of an embodiment, the gateway G (for example, the "Fieldgate" product of Endress+Hauser) is connected for communication with two servers S1 and S2 via a wired Ethernet®, company network N. The one server S1 forms simultaneously a superordinated unit, which, in reference to the field devices FD of the radio, or wireless, network RN, executes a process control. The other server S2 forms simultaneously a plant asset management system. Yet other (not shown) servers, fieldbus-systems, etc. can be connected to the company network N.

Figure 2:
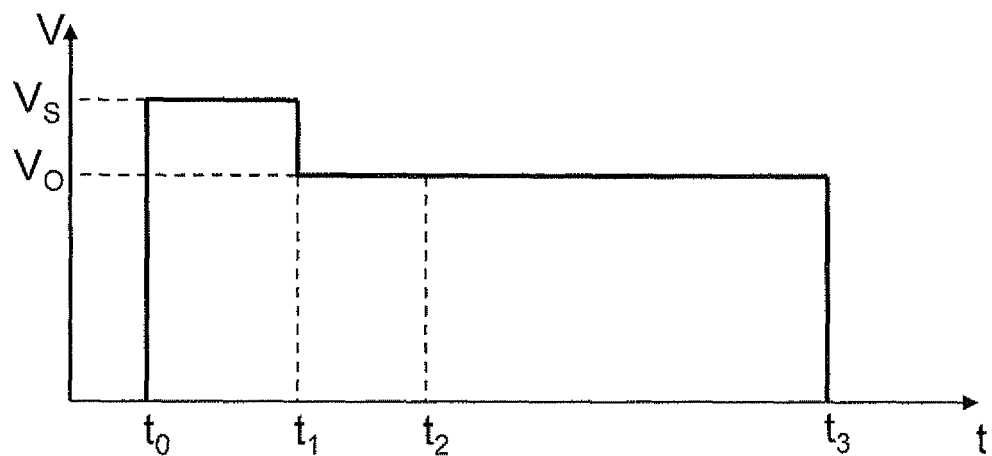
FIG. 2 is a schematic diagram presenting, by way of example, voltage requirement as a function of time for a HART® field device of a first field device type.

FIG. 2 shows, schematically, voltage requirement (voltage V as a function of time t) of a HART® field device of a first field device type, which, as shown in FIG. 1, is supplied with electrical energy by a wireless adapter and which is in the form of a sensor. The field device is in the case of the illustrated example of an embodiment clocked for the execution of a measured value request. In the periods of time, in which no measured value request is being processed by the field device, the system composed of wireless adapter and field device is switched off.

FIG. 2 shows the field device turned on at the point in time $t_0$. During a starting phase, the field device requires a starting voltage $V_S$. Furthermore, the field device requires a certain starting current, which can vary during the starting phase, depending on need. During the starting phase, the field device, for example, charges capacitors, performs self-checks, etc. Communication between the field device and the wireless adapter connected thereto is, however, still not possible. In the case of the illustrated example of an embodiment, the starting phase of the field device ends at the point in time $t_1$ and the field device then begins normal operation. Provided in the wireless adapter for the starting phase are the energy supply parameters, "starting voltage", "starting time" and "starting current", wherein the wireless adapter supplies the set starting voltage for the time period of the set starting time. For the energy supply parameter, "starting current", there is set the maximum electrical current value, which the field device requires during the starting phase. This setting is especially required internally in the wireless adapter, in order to be able to provide the correct starting voltage.

During normal operation, the field device requires an operating voltage $V_O$, which, in the illustrated example of an embodiment, is lower than the starting voltage $V_S$. In normal operation, communication of the field device via its HART® communication interface with the wireless adapter is possible. In normal operation, the HART® field device, which, in the present example of an embodiment, is in the form of a 2 conductor device, is operated especially in an (energy saving) multidrop mode. Alternatively, the HART® field device can, however, also be operated in a 4-20 mA mode, in which the electrical current value is set analogly (in known manner), in each case, corresponding to the measured value registered by the field device. Additionally, the 4-20 mA signal can be superimposed in known manner with a digital signal. In reference to the normal operational phase, there is provided in the wireless adapter the energy supply parameter, "operating voltage", by which is settable the voltage to be provided by the wireless adapter after expiration of the set starting time.

Directly after switching into normal operation, the field device can still provide no measured value. For example, the field device still requires time to record one or more measured value(s), to perform calculations, etc. The time period, which passes after the switching into normal operation (point in time $t_1$) until the point in time, when the field device can provide a measured value (point in time t2), is referred to as the setup time period. Depending on field device type, this time period can vary between some seconds up to some minutes. In the wireless adapter, the energy supply parameter, "setup time period", is provided, by which can be set the time period from the end of the starting time up to the point in time, at which the field device delivers a valid measured value. This setup time period can vary, depending on field device type. The set setup time period is allowed by the wireless adapter to pass after switching of the field device into normal operation, before the wireless adapter queries the field device for a measured value. During such waiting time, the wireless adapter can be operated in an energy saving mode, which enables an energy saving operation. In the case of the situation illustrated in FIG. 2, at the point in time t3, the measured value query has been completely executed and the field device is switched back off.

Figure 3:
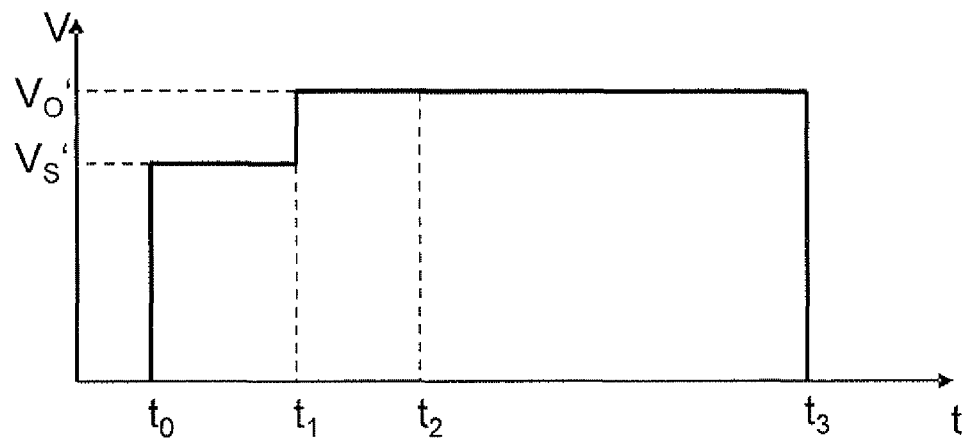
FIG. 3 is a schematic diagram presenting, by way of example, voltage requirement as a function of time for a HART® field device of a second field device type.

FIG. 3 shows, schematically as a function of time, the voltage requirement of a HART® field device of a second field device type.

In contrast to the voltage requirement illustrated in FIG. 2, in the case of the situation illustrated in FIG. 3, the required operating voltage $V_O'$ of the field device is higher than the required starting voltage $V_S'$. For the remainder, reference is made here to the description of FIG. 2.

In the following with reference to the schematic block diagram of FIG. 4, by way of example, a field device 2 and a thereto connected, wireless adapter 4 will now be explained. Field device 2 is a sensor and embodied as a 2 conductor device. Especially, the system composed of field device 2 and wireless adapter 4 forms a system, such as is represented in FIG. 1, in each case, by the pairs formed of a field device FD and a wireless adapter WA.

Field device 2 includes a measured value transducer 6 and a control unit embodied in the form of microprocessor 8. Furthermore, field device 2 includes a wired HART® communication interface 10 connected to microprocessor 8. Associated with HART® communication interface 10 is a functional unit 12, which is formed by an ASIC (Application Specific Integrated Circuit) and which performs the sending and/or receiving of signals (corresponding to the HART® standard) via the HART® communication interface 10. Via the HART® communication interface 10, field device 2 could, alternatively to the illustrated connection to the wireless adapter 4, be connected to a wired HARTS fieldbus system. Furthermore, field device 2 includes a data memory 14 and a display- and keypad unit 16. Furthermore, field device 2 is shown schematically to have a service interface 22, with which is associated a functional unit 24 in the form of an ASIC.

Wireless adapter 4 likewise includes a control unit in the form of a microprocessor 26. For data exchange over the radio network, microprocessor 26 is connected with a radio unit 28, which includes an RF chipset and an antenna 30. Radio unit 28 is, in such case, embodied in such a manner that the wireless communication occurs according to the wireless HART® standard. The microprocessor 26 is connected, furthermore, with a data memory 32. Stored in the data memory 32 are the parameter settings of the wireless adapter 4. The microprocessor 26 can access these parameter settings, in order to operate the wireless adapter 4 correspondingly to the parameter settings. The wireless adapter 4 includes, furthermore, a display- and keypad unit 33. For communication with the field device 2, the wireless adapter 4 includes a wired HART® communication interface 34, with which is associated a functional unit 36, which performs (according to the HART® standard) the sending and/or receiving of signals via the HART® communication interface 34. Functional unit 36 is provided in the form of an ASIC. The HART® communication interface 10 of the field device 2 and the HART® communication interface 34 of the wireless adapter 4 are connected with one another via a 2 conductor connecting line 38. Via this connection, there occurs both the communication between the field device 2 and the wireless adapter 4 as well as also the electrical current supply of the field device 2 by the wireless adapter 4. The wireless adapter 4 can thus provide wireless signal transmission for the connected field device 2.

For providing the electrical current supply of the field device 2 (and of the wireless adapter 4), the wireless adapter 4 includes an electrical current source in the form a single-use battery 40 and a power supply 42 connected to the single-use battery 40. Power supply 42 supplies (via electrical current supply lines, which are not shown) electrical energy (or electrical power) to the system components of the wireless adapter 4 as well as to the system components of the field device 2 via the HART® communication interface 34, the 2 conductor connecting line 38, the HART® communication interface 10 and a thereto connected power supply 44 of the field device 2. In such case, the individual power supplies 42 and 44 can also, in each case, be divided into a number of power supply stages. The power supply 42 of the wireless adapter 4 is operated by the microprocessor 26 in correspondence with the parameter settings of the energy supply parameters. Thus, the power supply 42 provides energy corresponding to the parameter settings.

A field device 2 and a thereto connected field device power supply module 4' will now be explained with reference to FIG. 5, by way of example, based on its schematic block diagram. Primarily differences compared with the arrangement illustrated in FIG. 4 will be explained. Field device 2 here is constructed like that illustrated in FIG. 4, so that, in turn, the same reference characters are used. Field device power supply module 4', in contrast to the wireless adapter 4 of FIG. 4, here provides no wireless signal transmission for the field device 2. Accordingly, field device power supply module 4' has no radio unit and no antenna. Field device power supply module 4' is constructed in manner corresponding to the wireless adapter 4 of FIG. 4. Especially, it includes a microprocessor 26', a data memory 32', a display- and keypad unit 33', a HART® communication interface 34', a functional unit 36' associated therewith, a single-use battery 40' and a power supply 42'. The HART® communication interface 10 of the field device 2 and the HART® communication interface 34' of the field device power supply module 4' are, again, connected with one another via a 2 conductor connecting line 38, so that communication according to the HART® standard is possible between the field device 2 and the field device power supply module 4'. In order, in the context of process control, to be able to communicate with a superordinated unit, the field device 2 is connected via its HART® communication interface 10 in the illustrated example of an embodiment, furthermore, by wire to a fieldbus, this being illustrated schematically in FIG. 5 by the branch 46 from the 2 conductor connecting line 38.

Figure 4:
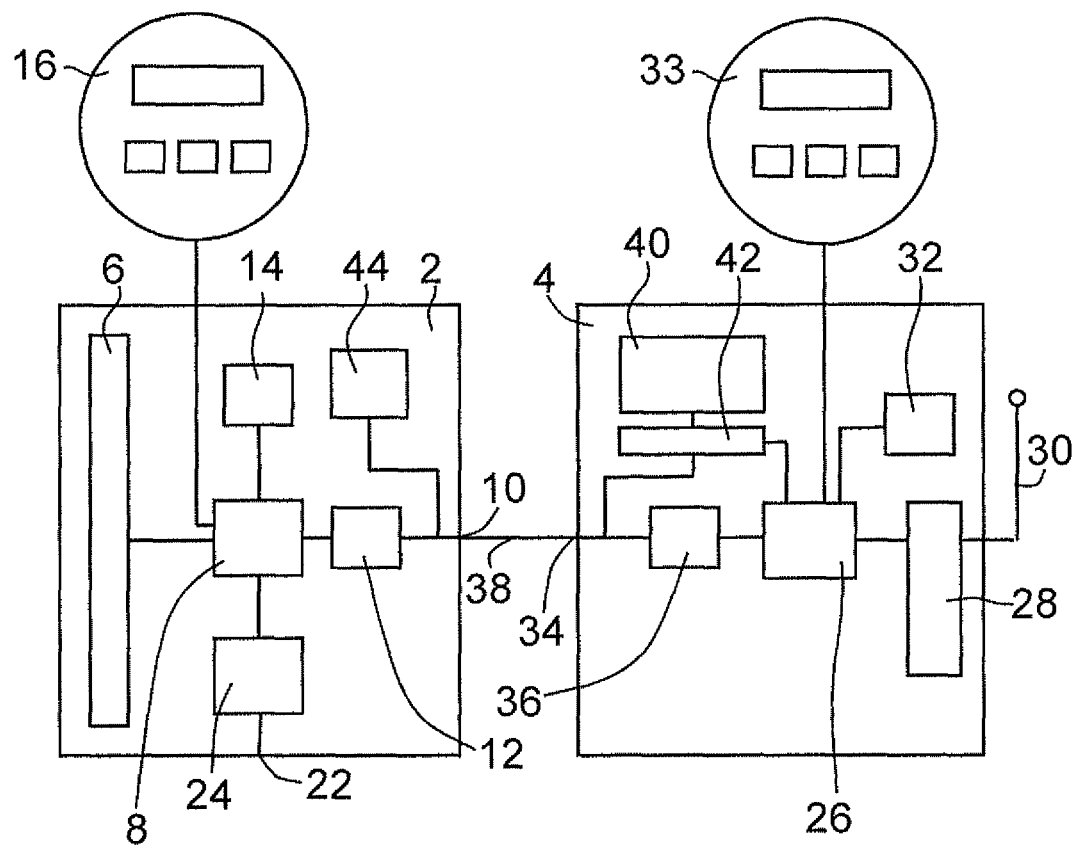
FIG. 4 is a block diagram of a field device and connected wireless adapter.
Figure 5:
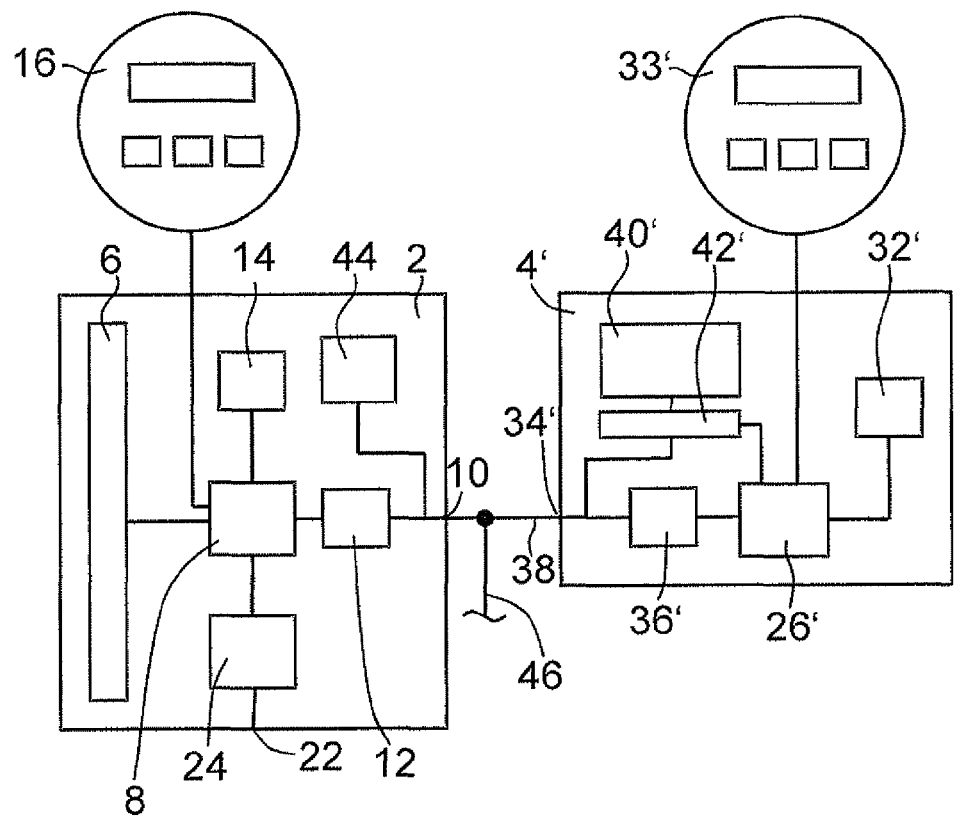
FIG. 5 is a block diagram of a field device and connected field device power supply module.
Figure 6A:
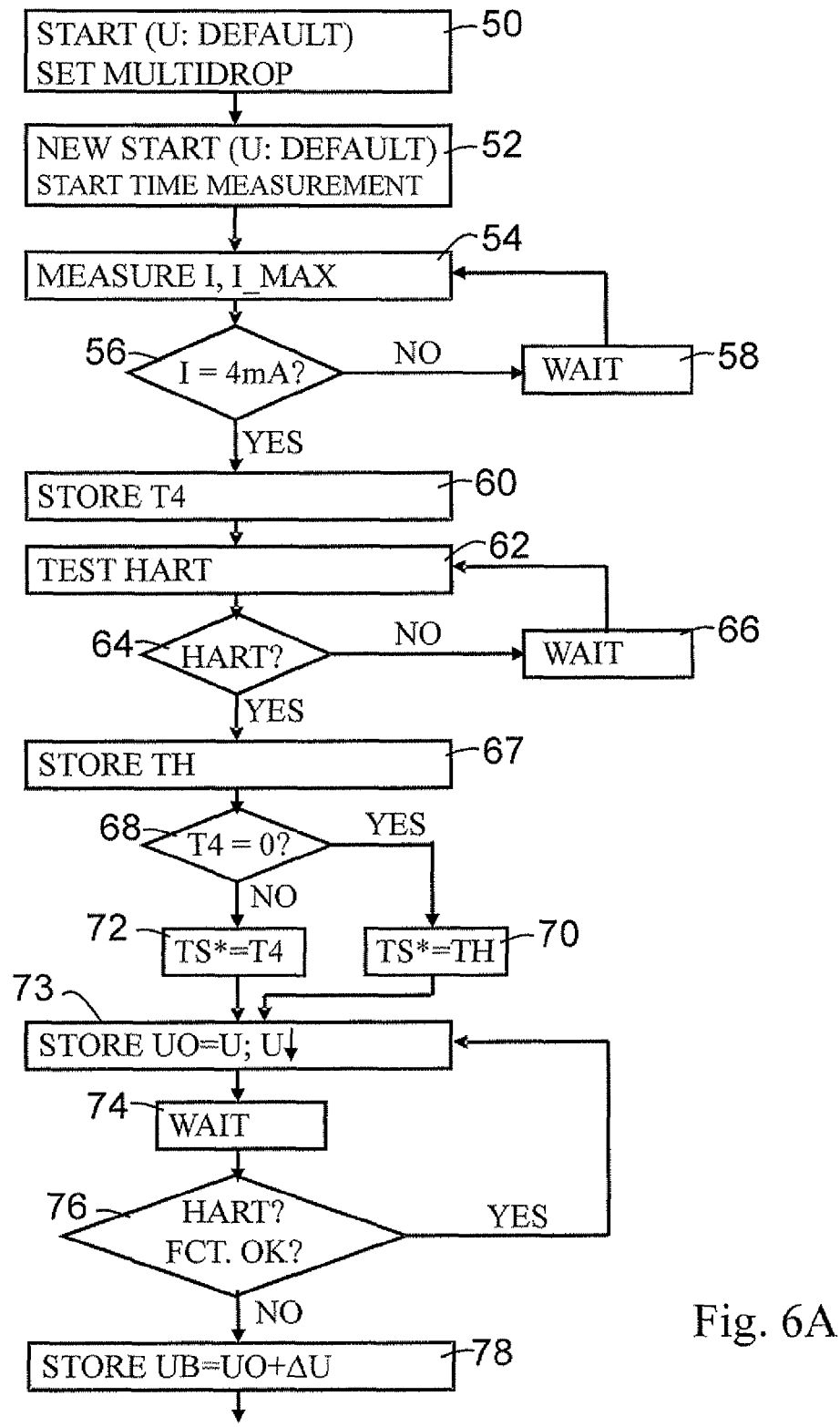
FIGS. 6A-6C are flow diagrams, in which is presented schematically a form of embodiment for optimizing the parameter settings of energy supply parameters of a wireless adapter.
Figure 6B:
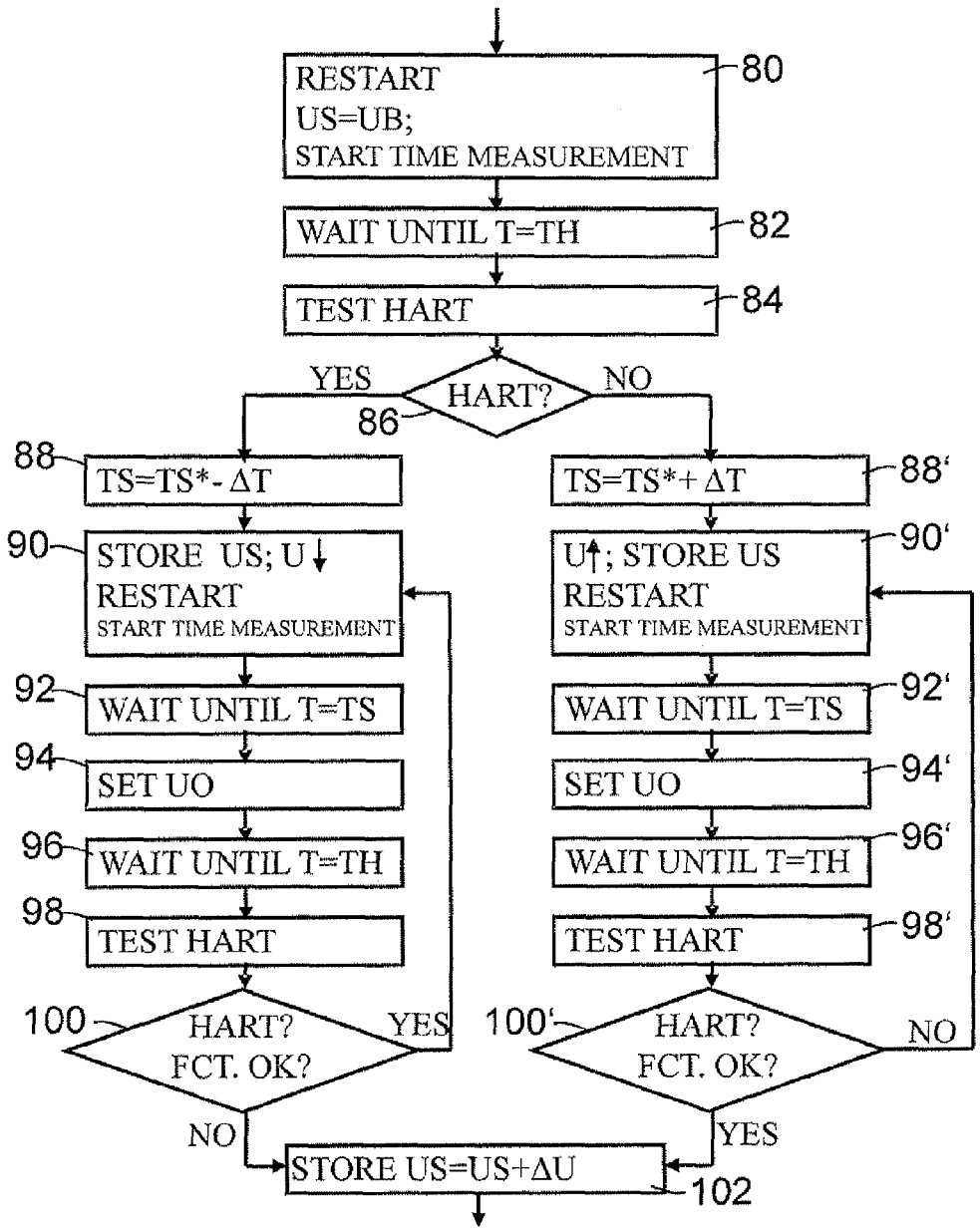
Figure 6C:
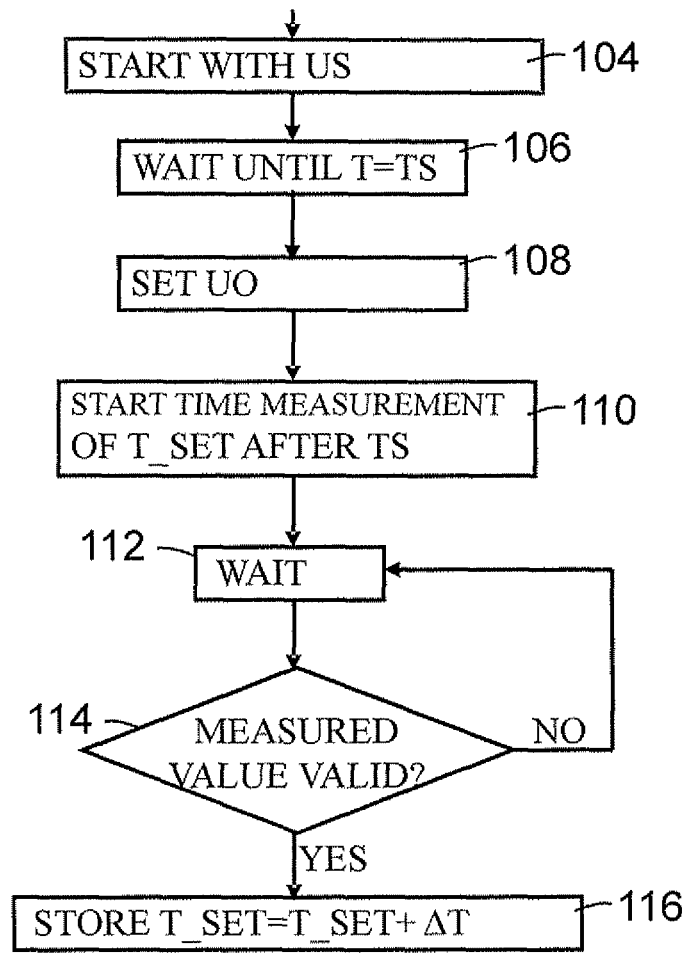

FIGS. 6A-6C show schematically a form of embodiment for optimizing the parameter settings of energy supply parameters of a wireless adapter, wherein the wireless adapter is connected to a field device in manner corresponding to the explanations above in reference FIGS. 1, 4 and 5. In such case, the field device is a HART®-field device in the form of a sensor. The parameter settings are ascertained, in such case, for operation of the field device in a multidrop mode.

FIG. 6A shows a flow chart for determining the (preliminary) parameter setting of a starting time TS* and the parameter settings of a starting current I_MAX and an operating voltage UO. First, the field device is started, wherein the parameter settings of the relevant energy supply parameters are set to default values, so that a sufficient energy supply for a plurality of field device types is assured and the connected field device can be safely started (compare "START (U: DEFAULT)" in box 50). After the field device has changed into normal operation, multidrop mode is set as the manner of operation (compare "SET MULTIDROP" in box 50). Then, the field device is switched back off. The steps illustrated in box 50 are not required, when the multidrop mode is already preset in the field device.

Then, a restart of the field device is performed, wherein the parameter settings of the relevant energy supply parameters are again set to default values (compare "NEW START (U: DEFAULT)" in box 52). The field device can therewith safely start and pass into normal operation. Time from the point in time of the switching on of the field device is measured (compare "START TIME MEASUREMENT" in box 52). As was above explained with reference to FIG. 2, the field device passes through the starting phase. During this, the electrical current used by the field device is measured and the maximum electrical current value I_MAX visited during the starting phase is captured. This maximum electrical current value I_MAX is adopted as parameter setting for the starting current (compare "MEASURE I, I_MAX" in box 54). After passing through the starting phase, the field device transfers automatically into normal operation (present due to the pre-setting of the multidrop mode).

The switching into normal operation can be detected by the fact that the electrical current value at the HART®-communication interface of the wireless adapter changes from a need dependent, electrical current value (which, as a rule, varies as a function of time) of the starting phase to a fixed, low, electrical current value (here: 4 mA). For this, the electrical current value used by the field device during the starting phase is monitored for when such changes to a constant electrical current of 4 mA (compare "I=4 mA?" in box 56). If is this still not the case, waiting is continued (compare "WAIT" in box 58) and the monitoring of the electrical current value is continued. As soon as a constant electrical current of 4 mA is established, the time period from turn-on of the field device to this point in time is stored as T4 (compare "STORE T4" in box 60). T4 is, in such case, provided as auxiliary parameter in the wireless adapter. Directly after switching into normal operation (or, in given cases, slightly later) HART® communication between the field device and the wireless adapter becomes possible via the HART® communication interface. This is in the case of the present form of embodiment likewise checked directly after finding the electrical current value of 4 mA (compare "TEST HART" in box 62). For this, the wireless adapter can, for example, send an ongoing query to the field device and ascertain the point in time, at which the field device first answers (compare "HART?" in box 64). If a HART® communication is still not possible, there is further waiting (compare "WAIT" in box 66) and the checking for HART® communication is continued. As soon as HART® communication is possible, is the time period from turn-on of the field device until such point in time is stored as TH, which is provided as an auxiliary parameter in the wireless adapter, (compare "STORE TH" in box 67). The auxiliary parameters T4 and TH are provided in the case of the illustrated form of embodiment for determining the starting time TS. Preferably, a user can perform no settings for these auxiliary parameters.

Field devices exist, which already during the starting phase assume a constant electrical current value of, for example, 4 mA. Accordingly, in the case of such field devices, the switching into normal operation is not based on the electrical current value recognition. For such devices, is in the case of the present form of embodiment, the switching into normal operation is set equal to the point in time, when HART® communication is first possible. For this, it is checked, whether zero was registered as the time period for T4 (compare "T4=0?" in box 68). If this is the case, then this indicates that the connected field device has assumed a constant electrical current value of 4 mA already in the starting phase. If is this case, the time period registered for TH is adopted as the preliminary parameter setting for starting time TS* (compare "TS*=TH" in box 70). If a time period greater than zero was registered for T4, then the time period registered for T4 is adopted as the preliminary parameter setting for the starting time TS* (compare "TS*=T4" in box 72).

The following steps serve for optimizing the operating voltage UO. First, the currently set voltage U, which is sufficient for normal operation and corresponds here to a default-setting, is stored as operating voltage UO (compare "STORE UO=U" in box 73). Then, the set voltage U is reduced (by a predetermined value) (compare "U↓" in box 73), followed by waiting (compare "WAIT" in box 74). In such case, the operation of the field device is monitored for the occurrence of malfunctions, respectively whether it is functioning OK. Especially, it is checked, here, whether HART® communication is possible (compare "HART?" in box 76), whether a device crash of the field device occurs and/or whether, in the case of an electrical current flowing through the field device, the electrical current value falls below a predetermined limit value (compare "FCT OK?" in box 76). If there is no malfunctioning, then the above explained steps of storing the currently set voltage U as operating voltage UO and the reducing the set voltage U are performed anew and the above explained loop is run through anew (compare the return arrow and the boxes 73, 74 and 76 in FIG. 6A). If in the step of monitoring a malfunction is detected, which is caused by an insufficient energy supply of the field device, ("NO" below box 76), then, as parameter setting for the operating voltage UO, the quantity, last stored value plus a predetermined voltage value ΔU as safety factor, is stored (compare "STORE UO=UO+ΔU" in box 78).

Then, the steps illustrated in FIG. 6B can be performed for optimizing the starting voltage US and the starting time TS. For this, the field device is, first of all, switched off and a restart performed (compare "RESTART" in box 80). In such case, the ascertained operating voltage UO value is applied as voltage value for the starting voltage US (compare "US=UO" in box 80). Time is measured from the point in time of the switching on (or restart) of the field device (compare "START TIME MEASUREMENT" in box 80). There is then a waiting period, until the time period ascertained for the auxiliary parameter TH runs out ("WAIT UNTIL T=TH" in box 82). To the extent that the field device properly passes through the starting phase and switches into normal operation, then HART® communication is possible between the field device and the wireless adapter. This is checked after expiration the time period TH (compare "TEST HART" in box 84 and "HART?" in box 86). If HART® communication is possible, such means that the set value for starting voltage US was sufficient and, thus, the starting voltage required for the field device during the starting phase is smaller than or equal to the voltage value ascertained for the operating voltage UO. In this case, the branch of the flow diagram shown in FIG. 6B on the left side is traversed. If, conversely, HART® communication is not possible, such means that the set value for starting voltage US was not sufficient and, thus, the starting voltage required for the field device during the starting phase is greater than the voltage value ascertained for the operating voltage UO. In this case, the branch shown in FIG. 6B on the right side is traversed.

The left branch of the flow diagram of FIG. 6B will now be explained. As parameter setting for starting time TS, there is subtracted from the ascertained, or measured, time period TS* (compare FIG. 6A) a predetermined offset $\Delta T$ (compare "TS=TS*$-\Delta T$" in box 88). This parameter setting is adopted for starting time TS. In this way, also during the switching of the field device from the starting phase into normal operation, a sufficient energy supply is assured, even when the switching occurs not exactly at the expected point in time (compare FIG. 3). Furthermore, the previously set starting voltage (in the case of which the starting phase was properly traversed) is stored (compare "STORE US" in box 90). Then, the voltage is reduced (compare "U↓" in box 90) and the field device restarted with this setting for starting voltage (compare "RESTART" in box 90). Time is measured rom the turn-on (or the restart) of the field device (compare "START TIME MEASUREMENT" in box 90). After expiration of the (already ascertained) starting time TS (compare "WAIT UNTIL T=TS" in box 92), the (already ascertained) voltage value for operating voltage UO is set (compare "SET UO" in box 94). After expiration of the time period TH (which equals or, in given cases, is greater than TS) (compare "WAIT UNTIL T=TH" in box 96), it is checked whether HART® communication is possible (compare "TEST HART" in box 98). Along with that, the manner of operation is also checked for the occurrence of additional malfunctions, as was explained above with reference to box 76 of FIG. 6A, (compare "HART? FCT OK?" in box 100). In this way, it can be detected whether the starting voltage was sufficiently high and the field device properly traversed the starting phase and switched into normal operation. If no malfunction is detected, then the loop as explained is traversed anew (compare the return arrow and the boxes 90, 92, 94, 96, 98 and 100). Especially, the above explained steps of storing the voltage value previously used as starting voltage and of the reducing the voltage value to be used as starting voltage for the next flow are performed. If the checking (compare box 100) finds a malfunction, then stored as parameter setting for the starting voltage US is the last stored value plus a predetermined voltage value $\Delta U$ as safety factor (compare "STORE US=US+$\Delta U$" in box 102). The safety factor $\Delta U$ for the starting voltage US must, in such case, not equal the safety factor $\Delta U$ for the operating voltage UO.

The right branch of the flow diagram of FIG. 6B will now be explained. As parameter setting for the starting time TS, there is added to the ascertained, or measured, time period TS* (compare FIG. 6A) a predetermined offset $\Delta T$ (compare "TS=TS*+$\Delta T$" in box 88'). This parameter setting is adopted for starting time TS. In this way, also during the switching of the field device from the starting phase into normal operation, a sufficient energy supply is assured, even when the switching does not occur exactly at the expected point in time (compare FIG. 2). Furthermore, the previously set starting voltage is increased and this voltage value stored as starting voltage (compare "U↑; STORE US" in box 90'). The following performing of the restart and the traversing of the boxes 90', 92', 94', 96', 98' and 100' occurs in the manner related for the left Branch with reference to boxes 90, 92, 94, 96, 98 and 100. If in checking the field device for malfunctions (compare "HART? FCT OK" in box 100') a malfunction is detected, then the loop is traversed anew (compare the return arrow and the boxes 90', 92', 94', 96', 98' and 100'). Especially, the steps of increasing the voltage value to be used as starting voltage for the next flow through and storing this (changed) voltage value as starting voltage are performed. If the checking finds no malfunction (compare box 100'), then, as already explained above, there is stored as parameter setting for starting voltage US the last stored value plus a predetermined voltage value $\Delta U$ as safety factor (compare "STORE US=US+$\Delta U$" in box 102).

There then come the steps of FIG. 6C, which can be performed for optimizing the setup time period. For this, a restart of the field device is performed, wherein for starting voltage US the earlier ascertained parameter setting is applied (compare "START WITH US" in box 104). After passing of the (already ascertained) starting time TS (compare "WAIT UNTIL T=TS" in box 106), the (already ascertained) voltage value for the operating voltage UO is set (compare "SET UO" in box 108). As was already explained above, the field device can provide a valid measured value after the end of the starting time only after expiration of a time period referred to as the setup time period. For determining the setup time period T_SET, time after expiration of the starting time TS is measured (compare "START TIME MEASUREMENT OF T_SET AFTER TS" in box 110). Furthermore, the wireless adapter sends an on-going measured value query to the field device and checks, at which point in time it first receives back a valid measured value (i.e. a measured value with a correspondingly positive status information) (compare "MEASURED VALUE VALID?" in box 114, return arrow and "WAIT" in box 112). Before expiration of the field device type specific, setup time period, the field device cannot provide a valid measured value, so that, in response to the query, it provides either no measured value or (e.g. a measured value with a status, "BAD"). As soon as the field device provides a valid measured value, there is added to the time period measured from the expiration of the starting time TS until this point in time an offset $\Delta T$ and this (increased) time period is stored as the parameter setting for the setup time period T_SET (compare "STORE T_SET=T_SET+$\Delta T$" in box 116). Therewith, suitable parameter settings for all energy supply parameters provided in the wireless adapter (starting voltage, starting current, starting time, operating voltage and setup time period) have been ascertained and the wireless adapter can now be operated with these parameters.

The present invention is not limited to the examples of embodiments explained with reference to the figures. Especially, other auxiliary parameters (here: T4 and TH) can be applied for determining the starting time. Furthermore, the individual steps can be executed in other sequences. Especially, the maximum electrical current used during the starting phase by the field device can also be measured, when an optimized starting voltage has already been set (e.g. in the case of the flow illustrated in FIG. 6C). Furthermore, parameter settings of a plurality of energy supply parameters can also be varied simultaneously.

The invention claimed is:

1. A method for optimizing the parameter setting of at least one energy supply parameter of a field device power supply module, which is connected to exclusively one field device and includes an electrical energy source or is connected to such, wherein the field device power supply module supplies the one connected field device with electrical energy, and the at least one energy supply parameter concerns energy supply of the field device by the field device power supply module, the method comprises the steps of:
 operating the system composed of the field device and the field device power supply module in an operational phase of the field device;
 automated varying, according to predetermined rules, of a parameter setting of at least one energy supply parameter of the field device power supply module relevant for the operational phase and automated monitoring of the operation of the field device; and
 automated ascertaining of a parameter setting of the at least one varied energy supply parameter, in the case of which a relatively low energy consumption of the field device and simultaneously a safe operation of the field device in the relevant operational phase can be realized.

2. The method as claimed in claim 1, wherein:
 the field device power supply module is in the form of a wireless adapter, by which a wireless signal transmission is effected for the connected field device.

3. The method as claimed in claim 1, wherein:
 the field device power supply module includes at least one autarkic, electrical current source,
 especially a single-use battery, a rechargeable battery and/or a solar cell.

4. The method as claimed in claim 1, wherein:
 the field device power supply module is connected to a communication interface of the field device.

5. The method as claimed in claim 1, wherein:
 said steps of automated varying, automated monitoring and automated ascertaining are executed by the field device power supply module.

6. The method as claimed in claim 1, wherein:
 in said step of automated varying, in an operational phase of the field device, a parameter setting of an energy supply parameter in terms of a voltage, which is to be provided to the field device in the relevant operational phase of the field device power supply module, is varied and the operation of the field device is monitored.

7. The method as claimed in claim 1, wherein:
 in said step of automated monitoring, operation of the field device is monitored for the occurrence of one or more of the following malfunctions:
 a) occurrence of a device crash of the field device;
 b) occurrence of an electrical current decline of the electrical current value flowing through the field device below a predetermined limit value; and/or
 c) occurrence of a disturbance of communication between the field device and the field device power supply module.

8. The method as claimed in claim 1, wherein:
 the field device power supply module (WA; 4; 4') has one or more of the following energy supply parameters:
 a) a starting voltage, which is provided by the field device power supply module after turn-on of the field device for a starting time;
 b) a starting current, which gives the maximum electrical current requirement of the field device during the starting time;
 c) a starting time, during which the starting voltage is provided by the field device power supply module for the field device;
 d) an operating voltage, which is provided by the field device power supply module after expiration of the starting time for normal operation of the connected field device; and/or
 e) a setup time period, which is the time period from the end of the starting time up to the point in time, at which the field device delivers a valid measured value.

9. The method as claimed in claim 1, wherein:
 for ascertaining a parameter setting of an energy supply parameter in terms of a time period of an operational phase of the field device or a time period of a section of an operational phase of the field device, a sufficient energy supply of the field device is provided by the field device power supply module and the time period is measured, which the field device requires for passing through the operational phase, or the section of the operational phase.

10. The method as claimed in claim 9, wherein:
 for the case, in which the field device requires a higher voltage in a following operational phase, as parameter setting of the energy supply parameter, a predetermined offset is subtracted from the measured time period; and/or
 for the case, in which the field device requires a lower voltage in a following operational phase, as parameter setting of the energy supply parameter, a predetermined offset is added to the measured time period.

11. The method as claimed in claim 8, wherein:
 for ascertaining a parameter setting in terms of the starting voltage, steps are performed as follows:
 placing the system comprising field device and field device power supply module in operation with a predetermined parameter setting of the starting voltage and monitoring the operation of the field device as to whether it switches into normal operation; and
 increasing the parameter setting in terms of the starting voltage to a higher voltage value, when the field device does not switch into normal operation; or
 lowering the parameter setting in terms of the starting voltage to a lower voltage value, when the field device switches into normal operation; and
 renewed placing of the system comprising the field device and the field device power supply module in operation with the changed parameter setting of the starting voltage and monitoring, the operation of the field device as to whether it switches into normal operation.

12. The method as claimed in claim 8, wherein:
 for ascertaining a parameter setting of the operating voltage in said step of automated varying in the operational phase of the normal operation of the field device, the set operating voltage varied is and the operation of the field device is monitored.

13. The method as claimed in claim 8, wherein:
 for ascertaining a parameter setting of the starting electrical current, the system comprising field device and field device power supply module is placed in operation; and
 a sufficient voltage for the starting phase is provided by the field device power supply module and the maximum electrical current value used by the field device during the starting time is measured by the field device power supply module.

14. The method as claimed in claim 1, wherein:
the ascertained parameter setting of the at least one energy supply parameter is adopted in the field device power supply module.

15. A field device power supply module, which has an electrical energy source, or is connectable to such, and which is embodied in such a manner, that it is connectable to exclusively one field device, that it can supply a connected field device with electrical energy, that it has energy supply parameters, which concern energy supply of a connected field device by the field device power supply module, and that it can perform the method comprising the steps of:
a method for optimizing the parameter setting of at least one energy supply parameter of a field device power supply module, which is connected to exclusively one field device and includes an electrical energy source or is connected to such, wherein the field device power supply module supplies the one connected field device with electrical energy, and the at least one energy supply parameter concerns energy supply of the field device by the field device power supply module, the method comprises the steps of:
operating the system composed of the field device and the field device power supply module in an operational phase of the field device;
automated varying, according to predetermined rules, of a parameter setting of at least one energy supply parameter of the field device power supply module relevant for the operational phase and automated monitoring of the operation of the field device; and
automated ascertaining of a parameter setting of the at least one varied energy supply parameter, in the case of which a relatively low energy consumption of the field device and simultaneously a safe operation of the field device in the relevant operational phase can be realized.

* * * * *